United States Patent Office 3,118,362
Patented Jan. 21, 1964

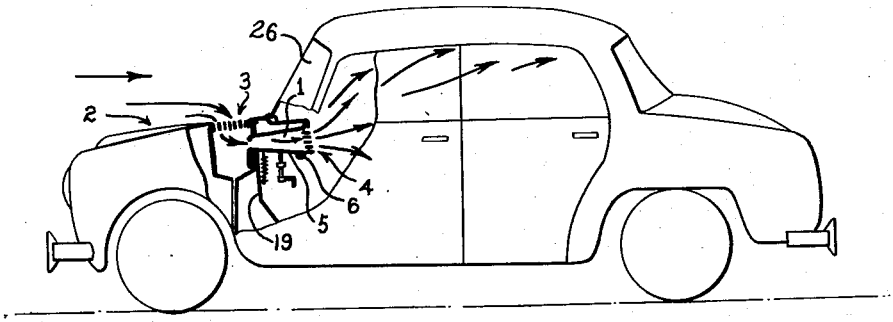
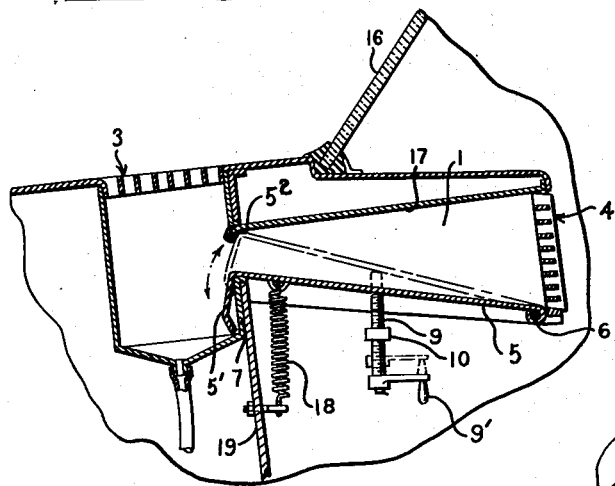
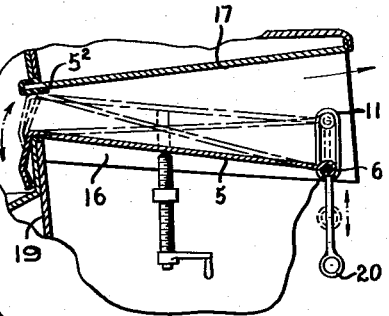
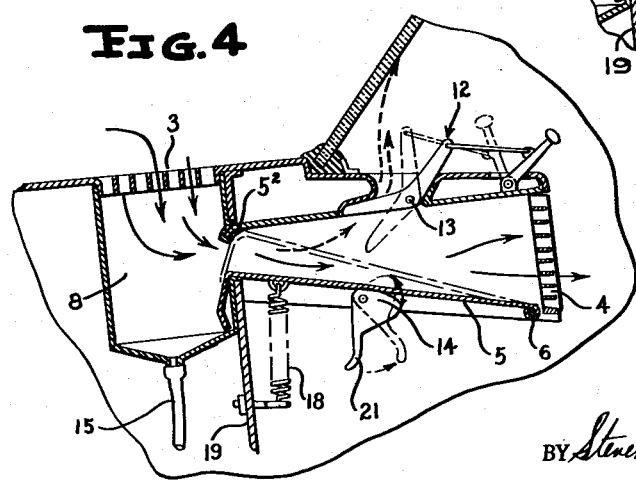
INVENTOR
Marcel Suisse

3,118,362
AUTOMOBILE AIR CONDITIONING MEANS
Marcel Suisse, 49 Rue Jeanne d'Arc, Saint-Mande, Seine, France, assignor of one-half to Regie Nationale des Usines Renault, Saint-Mande, France
Filed July 5, 1960, Ser. No. 40,937
Claims priority, application France July 8, 1959
5 Claims. (Cl. 98—2)

This invention relates to improvements in aerating devices for air-conditioning systems of houses, warehouses and vehicles of any description, such as automobiles, aircrafts, ships, railcars, etc.

It is concerned more particularly with an aerator comprising an adjustable diffuser-shutter and means for gradually and automatically reducing the velocity of flow of the fluid without creating whirling currents constituting a source of unpleasant noise and eddies, while maintaining relatively high air outputs due to the elimination of the pressure losses characterizing conventional apparatus wherein the adjustment involves the throttling of the cross-sectional area available for the passage of the air flow at a substantially constant speed.

In known adjustment systems the partial closing of a valve, shutter or like control member in a circuit whereby the fluid is distributed at a substantially constant rate creates a throttling action and lack of continuity in the cross-sectional area, with consequent losses of pressure and a turbulent, noisy downstream flow at high speed due to the output/pressure curve of the fans and distributor circuits.

It is the essential object of this invention, in a system of the type set forth hereinabove, to combine the reduction in the rate of fluid objection with the reduction in the output, this result being obtained gradually and automatically in a single step, and by the provision of a duct through which the aerating air is caused to flow, this duct comprising at least one movable, adjustable wall.

By varying the cross-sectional area at the inlet end of the adjustable diffuser with movable wall it is possible to regulate gradually and continuously the ejection outputs and speeds from zero output to maximum output.

The invention will now be described with reference to the attached drawing illustrating diagrammatically by way of example a few forms of embodiment of the present invention in the specific case of aerators comprising diffuser and shutter means which are designed for equipping an automotive vehicle.

In the drawing:

FIGURE 1 is a side elevation with a partial section taken substantially in the vertical longitudinal medial plane of a vehicle provided with a diffuser-type aerator, the arrows indicating the direction of flow of the air stream therethrough;

FIGURE 2 shows on a larger scale details of the device illustrated in FIG. 1;

FIGURE 3 is a modified embodiment of the mounting of the movable wall of the aerator, and FIGURE 4 is a modified embodiment wherein a baffle reflector is provided for de-misting the windscreen.

Referring to the drawing and more particularly to FIG. 1, the aerator duct or box 1 is mounted in the rear portion of the bonnet 2, beneath the windshield 26 and receives the incoming air through an upper grid 3; this air flows into the passenger space of the vehicle through a distributor grid 4. The bottom of duct 1 comprises a lower portion or wall 5 movable about a hinge pin 6. FIGS. 1 and 2 show in unbroken lines the movable wall in its open position, the closed portion being shown in dotted lines. The arrows indicate the path followed by the air stream as it flows along the duct and subsequently into the inner space of the vehicle.

FIG. 2 illustrates on a larger scale details of the arrangement shown in FIG. 1; in FIG. 2 the movable wall 5 is formed at its front end with a hook-like depending flange $5^1$ which, in the fully open position of the device, rests upon a shoulder or vertical flange 7 of the box 8 for receiving the incoming air flow through the grid 3. The bent flange $5^1$ of the movable wall 5, in the closed position, engages a sealing lip $5^2$ provided along the fixed wall 17 in order properly to seal the joint between the flange $5^1$ and fixed wall. Control means are also provided for adjusting the position of the movable wall 5; in the form of embodiment given by way of example this adjustment is effected by means of a threaded rod 9 provided with a control head, knob or crank-handle $9^1$ and guided in a fixed tapped or nut-forming member 10 secured inside the vehicle. The upper end of the substantially vertical rod 9 engages the lower face of the movable wall 5 and this wall may be set in any angular position to provide the desired aeration or ventilation by acting upon the head or crank-handle $9^1$ disposed within easy reach of the driver and/or passengers of the vehicle. The grid 4 may be provided, if desired, with a protection grid to prevent the ingress of foreign bodies and insects into the apparatus. Of course, any other wall of the duct may constitute the movable wall, instead of the lower wall, without departing from the scope of the invention. A spring 18 will be provided to urge the movable wall to its open position. The reference numeral 19 indicates the firewall between the engine and the passenger space.

FIG. 3 illustrates a modified form of embodiment wherein, in addition to the actuation proper of the movable wall 5 which has been described hereinabove, means are provided to permit a displacement of the hinge pin or axis 6 of this movable wall upwardly between lateral walls 16 under the control of the handle 20 connected to the hinge pin 6 in order to make it possible to effect its displacement in the slideways 11, when it is desired to vary the rate of flow of the outcoming air stream for a given output.

FIG. 3 illustrates the movable wall 5 having its hinge pin 6 displaceable in fixed slideways 11.

FIG. 4 shows another modification of the device of this invention which consists in mounting a streamlined baffle deflector 12 adapted to receive and deflect one fraction of the air stream toward the inner face of the windscreen to be demisted, with the necessary output and flow speed. This deflector 12 is mounted for pivotal movement about a hinge pin 13 and adapted to be operated for example by means of a hand lever disposed within easy reach of the driver. In FIG. 4, this deflector 12 is shown in full lines in its retracted or inoperative position, and in dotted lines in its operative position in which it takes air from the duct and directs it, due to its curved streamlined contour, toward the windscreen. In the embodiment illustrated in FIG. 4 the movement of the movable wall 5 is controlled by means of a cam 14. A drain pipe 15 is fitted in the bottom of the box 8 to discharge any rainwater or washwater having penetrated therein.

The operation of the aerator device described hereinabove in its different forms of embodiment will be readily understood.

In the fully-open position the lower movable wall 5 of the diffuser provides the maximum cross-sectional area for the incoming air stream so that the highest output is obtained for a given upstream rate of flow.

With this diffuser it is possible to gradually reduce the velocity of flow of the fluid downstream while improving the general efficiency of the device without producing any loss of pressure and/or undesirable sound.

In the fully-closed position the sealing engagement between the front edge of the upper fixed wall and the front edge of the movable wall prevents any passage of air so as to provide a zero output by obturation.

If the screw rod 9 or cam 14 is actuated in order gradually to open the inlet end of the diffuser by moving the front edges of the opposite movable and fixed walls away from each other, it will be readily understood that, between the adequate closed position and the fully-open position in a complete range of intermediate angles of aperture will provide different outputs and that the outcoming air stream will flow at a speed proportional to the specific output for which the device is thus adjusted.

Indeed, by gradually opening the device or divaricating the two walls away from each other two parameters are varied:

(1) The cross-sectional area of the inlet end as an absolute value for adjusting the outputs (with practically constant pressure and upstream speed);

(2) The ratio of this inlet cross-sectional area to the constant cross-sectional area of the outlet.

Under these conditions, with a low output this ratio is very small, of the order of 1:40 to 1:20, and the rate of flow at the outlet is reduced in substantially the same proportions and remains very low for a given upstream speed.

On the contrary, when the diffuser is fully open the ratio (inlet area to outlet area) increases and becomes 1:3 to 1:2, and the air speed at the outlet is reduced only in the same proportion. Thus, it will increase its intensity while improving the range and efficiency of the fluid flow for a same upstream speed, as in the preceding example.

Therefore, the adjustment is logical and automatic with a single operation of the movable wall to reduce the upstream outflow speed substantially constant or if desired variable as a consequence of the pressure variation resulting from the output/pressure curve of the ventilator or circuit.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. Means including an automobile for conditioning the air in the interior of the automobile comprising a duct having an open inlet and an open outlet end, means communicating the inlet end with the atmosphere, the outlet end being in communication with the interior of the automobile, said duct including two lateral walls extending substantially the full length of the duct and joined by a fixed wall, a longitudinal, movable wall situated opposite said fixed wall and pivotally mounted between the lateral walls near the open outlet end for pivoting between said two lateral walls, whereby the air inlet opening on said inlet end is defined by the inlet ends of said lateral walls, said fixed wall and by the free end of the movable wall, the outlet section of said outlet end being greater than the maximum section of said inlet opening, said movable wall controlling the section of the inlet end and acting as a shutter to permit the adjustment of the intermediate air outputs between maximum output and zero output, the velocity of flow of the outcoming air stream being a function of the air output and means for actuating said movable wall.

2. The combination of claim 1, wherein said actuating means includes a rotatable cam engaging the movable wall.

3. The combination of claim 1, wherein said automobile has a bonnet and a windshield and said means communicating the inlet end with the atmosphere includes a box arranged under the bonnet in front of the windshield and said bonnet having an opening located on top of the bonnet directly in front of the windshield and in communication with the box and said box having an open end adjoining the inlet end of the duct, a flange on said box arranged transverse of the inlet end of the duct and forming one edge of the box opening, said movable wall having a flange on its outer end adapted to slide in cooperation with the flange on the box in the open position of the movable wall, and said outer end of the movable wall adapted to abut in cooperation with the fixed wall in the closed position of the movable wall.

4. The combination of claim 1, wherein hinge means connects the inner end of the movable wall at the outlet end of the duct and means mounting said hinge means for adjustment perpendicularly of the duct to move the hinged inner end of the movable wall substantially perpendicularly with respect to the duct axis and vary the outlet end section of the duct.

5. The combination of claim 1, including a windshield wherein said fixed wall being the upper wall disposed beneath the windshield and said movable wall being the lower wall of the duct and a baffle deflector mounted in an opening in the fixed wall adjacent the inside of the windshield for deflecting a portion of the air stream in the duct upwardly under the windshield.

References Cited in the file of this patent

UNITED STATES PATENTS

| | | |
|---|---|---|
| 1,909,931 | Dickerson | May 23, 1933 |
| 2,082,700 | Knutzen | June 1, 1937 |
| 2,729,158 | Wilfert | Jan. 3, 1956 |

FOREIGN PATENTS

| | | |
|---|---|---|
| 743,639 | Germany | Dec. 30, 1943 |
| 804,509 | France | Oct. 26, 1936 |